United States Patent
Vignotto et al.

(10) Patent No.: US 6,491,441 B2
(45) Date of Patent: *Dec. 10, 2002

(54) TAPERED BEARING UNIT

(75) Inventors: Angelo Vignotto, Turin; Francesco Savarese, Airasca, both of (IT)

(73) Assignee: SKF Industrie S.p.A., Turin (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/518,332

(22) Filed: Mar. 3, 2000

(65) Prior Publication Data

US 2002/0054722 A1 May 9, 2002

(30) Foreign Application Priority Data

Mar. 4, 1999 (IT) .......................................... T099A0163

(51) Int. Cl.[7] ............................................... F16C 33/46
(52) U.S. Cl. ...................... 384/559; 384/569; 384/571; 384/572
(58) Field of Search ................................. 384/571, 572, 384/569, 523, 576, 559

(56) References Cited

U.S. PATENT DOCUMENTS

| | | |
|---|---|---|
| 2,053,478 A | 9/1936 | Horton |
| 2,336,767 A | 12/1943 | Ash |
| 2,344,038 A | 3/1944 | Griffiths |
| 2,447,838 A | 5/1948 | Bergstrom et al. |
| 2,570,559 A | 10/1951 | Juergenson |
| 2,877,054 A | 3/1959 | Hedlund |
| 3,366,421 A | 1/1968 | Bradley |
| 3,562,484 A | 2/1971 | Murdock |
| 3,564,477 A | 2/1971 | Pompei |
| 3,713,686 A | 1/1973 | Eddy |
| 3,745,392 A | 7/1973 | Phoenix |

(List continued on next page.)

FOREIGN PATENT DOCUMENTS

| | | |
|---|---|---|
| DE | 3524063 | 7/1985 |
| DE | 43 31 033 | 8/1993 |
| DE | 43 38 261 A | 5/1994 |
| DE | 196 44 744 | 5/1998 |
| EP | 0 156 552 | 10/1985 |
| EP | 0 475 841 | 3/1992 |
| EP | 0 522 933 | 1/1993 |
| EP | 0 607 719 | 7/1994 |
| EP | 0 675 364 | 10/1995 |
| EP | 0 681 185 | 11/1995 |
| EP | 0 726 468 | 8/1996 |
| EP | 0 753 679 | 1/1997 |
| EP | 0 807 775 | 11/1997 |
| EP | 0 875 700 | 11/1998 |
| GB | 2 112 085 | 12/1982 |
| GB | 2 207 470 A | 2/1989 |
| IT | 94A 000 596 | 7/1994 |
| JP | 63 043067 | 2/1988 |
| JP | 7-127647 | 5/1995 |

Primary Examiner—Lenard A. Footland
(74) Attorney, Agent, or Firm—Merchant & Gould P.C.

(57) ABSTRACT

A tapered roller bearing comprising an outer race, a pair of axially adjacent inner races, and two cages interposed between the inner and outer races to retain two sets of rollers. The radially outer surface of each inner race has, close to the end facing the center of the bearing, a groove able to receive a respective plurality of radially inwardly projecting portions of the parts of the cages disposed close to the center of the bearing so that the cages retain the rollers on the respective inner races during the handling and assembly steps which precede mounting of the sub-units comprising the inner race, cage and rollers into the outer race. A pair of seal devices is fixed to the outer race and interposed between the outer race and each inner race close to the outer sides of the bearing.

6 Claims, 2 Drawing Sheets

U.S. PATENT DOCUMENTS

| | | |
|---|---|---|
| 3,749,450 A | 7/1973 | Senter |
| 3,857,611 A | 12/1974 | Pansky |
| 3,905,173 A | 9/1975 | Gerken |
| 4,043,620 A | 8/1977 | Otto |
| 4,052,045 A | 10/1977 | Shaddix |
| 4,283,091 A | 8/1981 | Enders |
| 4,377,312 A | 3/1983 | Zackrisson |
| 4,427,242 A | 1/1984 | Otto |
| 4,502,739 A | 3/1985 | Flander |
| 4,567,344 A | 1/1986 | Michalski, Jr. |
| 4,664,538 A | 5/1987 | Galbato |
| 4,667,156 A | 5/1987 | Machino |
| 4,689,958 A | 9/1987 | Arino |
| 4,708,497 A | 11/1987 | Lederman |
| 4,787,681 A | 11/1988 | Wang |
| 4,795,278 A | 1/1989 | Hayashi |
| 4,817,775 A | 4/1989 | Baccalaro |
| 4,824,265 A | 4/1989 | Hofmann et al. |
| 4,940,937 A | 7/1990 | Hattori |
| 5,139,425 A | 8/1992 | Daviet |
| 5,199,801 A | 4/1993 | Grehn et al. |
| 5,215,387 A | 6/1993 | Bertetti |
| 5,385,410 A | 1/1995 | Shirai |
| 5,415,418 A | 5/1995 | Stimpson |
| 5,454,647 A | 10/1995 | Otto |
| 5,575,568 A | 11/1996 | Rigaux |
| 5,695,290 A | 12/1997 | Mondak |
| 5,736,853 A | 4/1998 | Rigaux |
| 5,863,135 A | 1/1999 | Bildtsen |

TAPERED BEARING UNIT

DESCRIPTION

The present invention relates to a tapered roller bearing of the type defined in the preamble to claim 1.

Conventionally, as illustrated in attached FIG. 1 which is a partial axial section of a roller bearing of known type, each of the two radially inner half-races 10 is formed with a step 11 close to the inner end which faces towards the centre of the bearing. This step serves, during the transfer stages which precede assembly of the sub units comprising the sets of rollers 12 and associated cages 13 on respective inner half-races, and before insertion of these sub-units into the outer race 14, to prevent the rollers from accidentally escaping from the rolling tracks in the direction indicated by the arrows A and A' in FIG. 1.

The formation of the above-mentioned step involves a first disadvantage in that its shape, projecting radially from the rolling plane of the rollers, requires the provision of excess metal of a significant thickness t on the forged blank race, the outline of which is indicated in broken outline in FIG. 2. Moreover, it takes a long time for the significant mass of material constituting the excess metal to be removed by turning and grinding operations (proportional to the quantity of excess metal to be removed); in addition, the weight of the forged blank is detrimentally effected by the excess metal part. This known technique is therefore disadvantageous from a productive point of view, relating both to the working time taken for finishing and the weight of the component, which detrimentally influences the transfer operations.

The said step involves a second disadvantage in that, to complete an inner half-race, the sub-unit comprising the preliminarily assembled rollers in their cage must be fitted onto the half-race by passing them over the step; this subunit is assembled by pressing the rollers and the cage in the opposite directions from those indicated by the arrows A and A' in FIG. 1.

In the formation of the half-races by stamping elements obtained from bar stock, it is advantageous if the shape which is impressed in the stamping phase of the forging corresponds substantially to the shape of the finished product which is obtained subsequently by working, that is turning and grinding, the blank workpiece. As can be observed from FIG. 2, the presence of the step makes the conical surfaces C and C' of the stamped blank and the finished piece respectively are not parallel. In the grinding operation, therefore, a surface (C') is formed which is orientated differently from the surface (C) which was formed by stamping.

Whilst it is not desired to be bound to any theory in this connection, the Applicant has reason to believe that it would better exploit the structural strength of the half-races if the form impressed by the stamp were to correspond to the shape which it will have during use supporting a load. In other words, a greater strength would be obtained, and consequently a longer useful life for the bearing if the said conical surfaces were parallel.

Referring again to FIG. 1, the inner cylindrical surface of the half-races is further worked in such a way as to form retaining grooves 16 for a temporary retainer ring 17, usually of plastics or metal. This, by holding the two inner half-races together axially, prevents each of them from accidentally slipping out from the outer ring 14, thus preventing escape of the rollers. This arrangement, while being effective, is expensive in that it requires the formation of the temporary retainer ring 17—which once the bearing is assembled, loses its function—and in that it is also necessary to form the said retainer grooves 16.

An object of the present invention is to provide a tapered roller bearing in which the radially inner races do not have the conventional step discussed above, so as to avoid the above-indicated disadvantages.

Another object of the invention is to provide a bearing which does not need the conventional temporary retainer ring, and avoids the disadvantages associated therewith.

This and other objects which will become better understood hereinafter, are achieved in accordance with the present invention by a bearing having the characteristics set out in claim 1.

Other important characteristics are set out in the dependent claims.

Further characteristics and advantages of the invention will become clearer from the detailed description of an embodiment thereof, with reference to the attached drawings, given purely by way of non-limitative example, in which.

Figure 3:
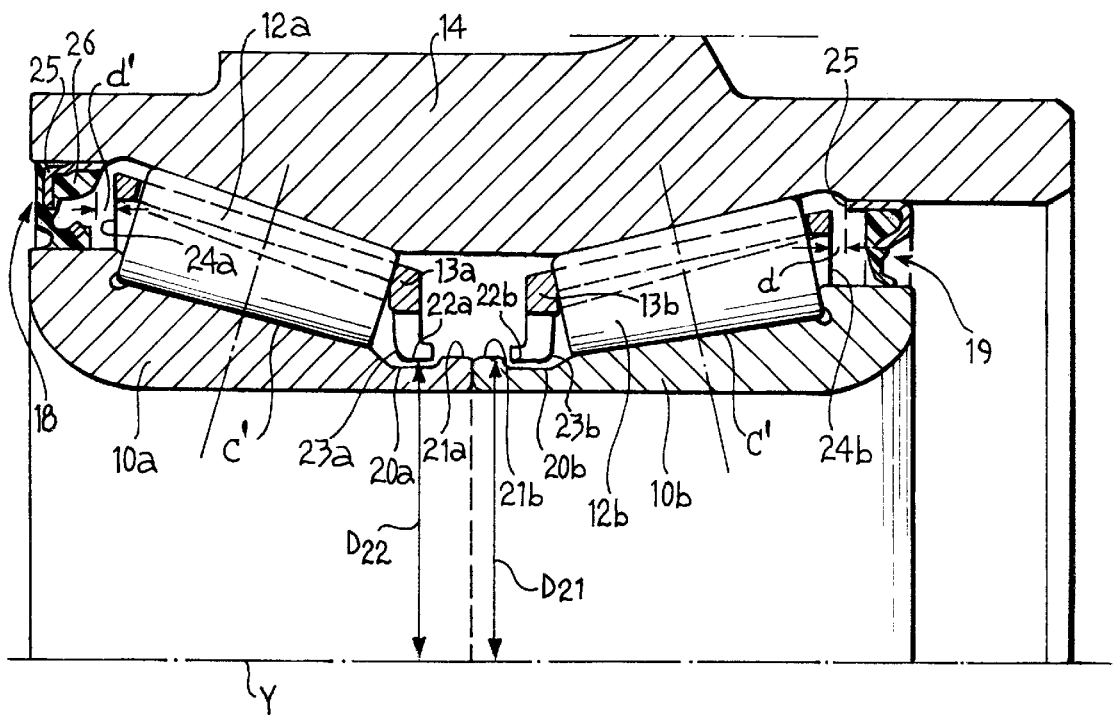
FIG. 3 is a partial axial section of a tapered roller bearing according to the present invention.

Referring to FIG. 3, a tapered roller bearing comprises an outer race 14, a pair of axially adjacent radially inner races (or half-races) 10A and 10B, two sets of tapered rollers 12A, 12B interposed between the outer race 14 and the inner races 10A, 10B respectively, and a pair of retainer cages 13A, 13B for the respective sets of rollers 12A, 12B. Reference numerals 18 and 19 generally indicate retainer devices of known type fixed to the outer race 14 and interposed between this and each of the inner half-races 10A, 10B close to the outer sides of the bearing.

As used here, the terms "axially inner" and "axially outer" must be interpreted with reference to the mid plane X of the bearing in the absence of any different indications.

Figure 4:
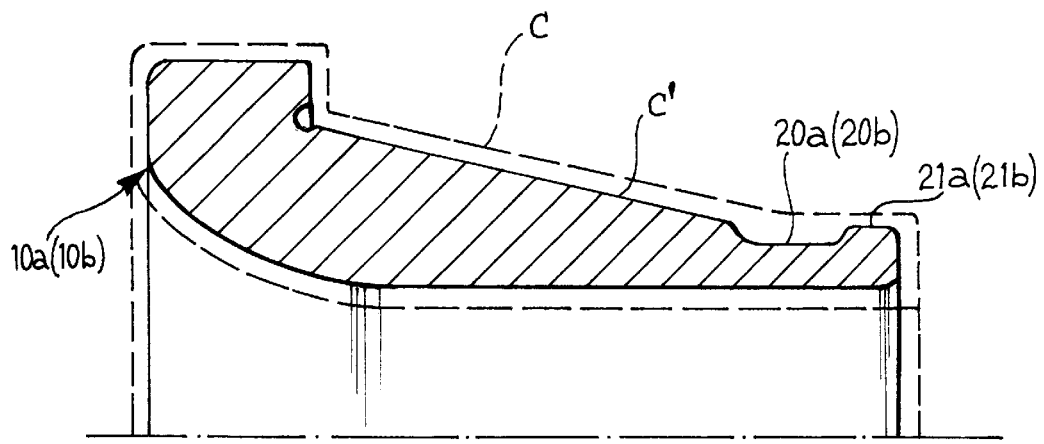
FIG. 4 is a partial axial section of an inner half-race for the bearing of FIG. 3.

Referring also to FIG. 4, according to the invention the radially outer surface of each half-race 10A, 10B is shaped in such a way as to have a respective groove 20A, 20B close to the axially inner end thereof. The grooves 20A, 20B join the conical rolling surfaces C' with radially outwardly projecting borders 21A, 21B situated at the axially inner ends of the half-races.

Figure 2:
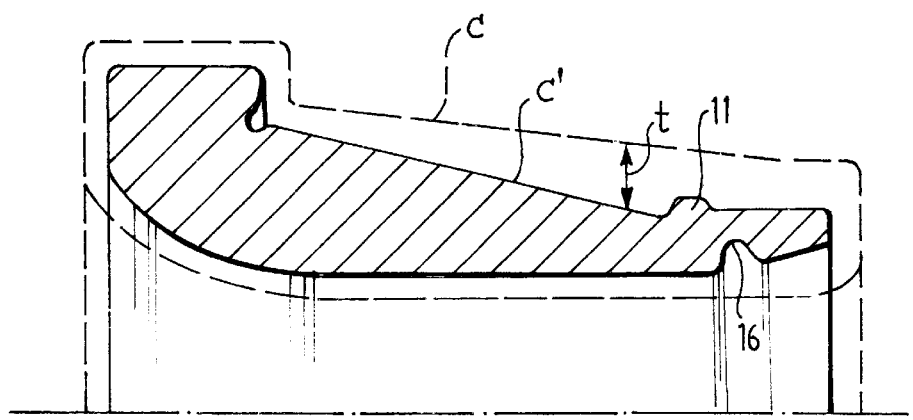
FIG. 2 is a partial axial section of an inner half-race formed according to the prior art.

As can be observed from comparing FIGS. 2 and 4, in the arrangement of the present invention both the step 11 of FIG. 2 and the groove 16 intended to permit the engagement of the conventional temporary container ring are eliminated; this element is also eliminated as will be discussed hereinafter.

Referring to FIG. 3, at their axially inner ends the cages 13A, 13B for retaining the rollers have respective radially inwardly projecting portions, preferably in the form of teeth or flexible tongues 22A, 22B. Once the cages are assembled with the rollers onto the inner half-races the free ends of the tongues 22A, 22B (in the undeformed condition) are spaced from the central axis Y of rotation of the bearing by a distance $D_{22}$ slightly less than the distance $D_{21}$ present between the central axis Y and the radially outermost parts of the borders or raised parts 21A, 21B.

In the preferred embodiment illustrated in FIG. 3 the portions 23A, 23B of the flexible tongues of the cages facing towards the outer sides of the bearing are rounded so as to make it easier for them to ride over the raised portions 21A, 21B when the two sub-units constituted respectively by the rollers 12A and cage 13A, or rollers 12B and cage 13B, are pressed in opposite directions from those indicated by the arrows A and A' to position the rollers onto the respective inner rolling tracks C'. In riding over the raised portions 21A, 21B the flexible tongues snap engage into the grooves 20A, 20B. In this way the cages retain the rollers on the respective inner races during the handling and assembly steps which precede the assembly of each sub-unit, comprising inner-race, associated cage and rollers, into the outer race.

Once the rollers are coupled to the respective half-races as discussed above, each of the two sub-units thus constituted is inserted into the outer race 14 as indicated by the arrows A and A'. Assembly of the bearing is completed by fixing the seal devices 18 and 19 onto the outer race.

Still according to the invention, the seal devices 18 and 19 are fixed to the outer race 14 in axial positions such that there is a predetermined small axial clearance d between each seal device and the axially outer ends 24A, 24B of the cages. The axial clearance d is preferably in the range 0.5–2 mm and will in any case be chosen in such a way as to prevent the sub-units from becoming displaced too far outwardly (in the directions opposite those indicated by the arrows A and A') so as to reach positions in which the rollers could accidentally escape from the bearing during the handling stages which precede the assembly of the complete bearing onto the motor vehicle.

Figure 1:
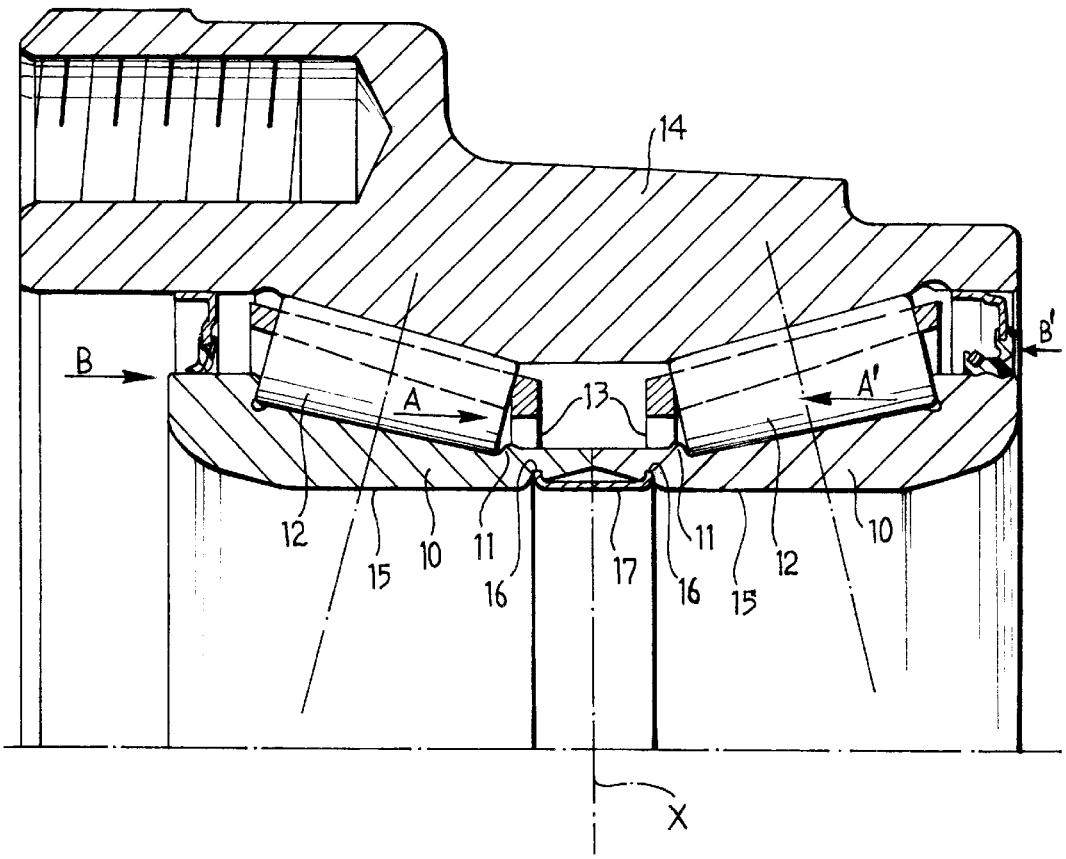
FIG. 1 is a partial axial section of a prior art tapered roller bearing.

Owing to this arrangement, which makes it possible advantageously to exploit the same seal devices 18 and 19 as axial stop elements to retain the inner sub-units in the outer race of the bearing, it is possible to eliminate the conventional temporary retainer ring 17 discussed with reference to FIG. 1.

The radial surface of the seal device against which the outer ends 24A, 24B of the cages can abut may indifferently be constituted either by a part of the metal annular insert 25 (as illustrated at the right hand side of FIG. 3) or by a part of the rubber seal 26 which is normally vulcanised onto the insert 25 (as illustrated at the left hand side of FIG. 3).

It is to be understood that the invention is not limited to the embodiments described and illustrated here, which are to be considered as examples of the bearing; but rather the invention is capable of modifications to the shape, arrangement of parts, constructional and functional details. For example, the axial clearance d discussed above could be formed by suitably dimensioning the cages and/or the seal devices.

What is claimed is:

1. A tapered roller bearing for a motor vehicle wheel hub, of the type comprising:
    a radial outer race,
    a pair of axially adjacent radial inner races,
    two annular cages interposed radially between said inner races and said outer race to retain between them two respective sets of rollers, wherein a radial outer surface of each of the inner races has, close to an end facing a center of the bearing, a groove for receiving a respective plurality of radially inwardly projecting portions extending from parts of the said cages disposed proximate the center of the bearing, whereby the cages retain the rollers on respective inner races during transfer and assembly steps which precede assembly of sub-units comprising the inner race, cage and rollers to the outer race, and
    a pair of seal devices fixed to the outer race and interposed between the outer race and each inner race close to outer sides of the bearing, wherein each of the said seal devices has at least one axial stop surface which defines, with an axially outer end of the associated cage, a predetermined small axial clearance such as to prevent any component of the said sub-unit from being able to escape from the bearing during handling steps which precede mounting of the bearing onto the motor vehicle.

2. A bearing according to claim 1, wherein said inner races have respective tapered rolling tracks obtained by machine working blank workpieces having corresponding tapered surfaces substantially parallel to the said tapered surfaces to be obtained in the finished product.

3. A bearing according to claim 1, wherein said axial clearance lies in a range of about 0.2–0.8 inches.

4. A bearing according to claim 1, wherein said radially projecting portions of the cage comprise a plurality of flexible tongues able to snap engage into the said grooves.

5. A bearing according to claim 4, wherein said flexible tongues have portions facing the outer sides of the bearing shaped so as to be able easily to ride over respective radially inwardly projecting border portions projecting from the ends of the inner races facing towards the centre of the bearing.

6. A bearing according to claim 5, wherein said outwardly facing portions of the bearing are rounded.

* * * * *